United States Patent

Mohajer et al.

[11] Patent Number: 5,889,142
[45] Date of Patent: Mar. 30, 1999

[54] SELECTIVE POLYAMIDE RECOVERY FROM MULTI-COMPONENT MATERIALS

[75] Inventors: Yousef Mohajer; Thomas Paul Izod, both of Midlothian; William Bernard Fisher, Chester, all of Va.; Scott Martin Hacker, River Edge, N.J.

[73] Assignee: AlliedSignal Inc., Morristown, N.J.

[21] Appl. No.: 840,977

[22] Filed: Apr. 21, 1997

[51] Int. Cl.⁶ .................................. C08F 6/00; C08F 6/12
[52] U.S. Cl. ........................ 528/480; 528/481; 528/503
[58] Field of Search ...................... 528/480, 481, 528/503

[56] References Cited

U.S. PATENT DOCUMENTS

| | | | |
|---|---|---|---|
| 3,317,519 | 5/1967 | Lazarus et al. | 260/239.3 |
| 5,241,066 | 8/1993 | Davis et al. | 540/540 |
| 5,280,105 | 1/1994 | Moran, Jr. | 528/486 |
| 5,310,905 | 5/1994 | Moran, Jr. | 540/540 |
| 5,430,068 | 7/1995 | Subramanian | 521/40 |
| 5,457,197 | 10/1995 | Sifniades et al. | 540/540 |

FOREIGN PATENT DOCUMENTS

| | | |
|---|---|---|
| 0603434 | 6/1994 | Germany . |
| 4421239 | 6/1994 | Germany . |

*Primary Examiner*—P. Hampton Hightower
*Attorney, Agent, or Firm*—Melanie L. Brown; Virginia S. Andrews; Roger H. Criss

[57] ABSTRACT

A process for selectively separating polyamides from multi-component waste materials including the steps of subjecting the multi-component mix to a specific mixture of caprolactam and water at a preselected temperature range below the degradation temperature of the polymer to be recovered, separating the formed polyamide solution, and recovering the desired polyamide. The process is very desirable for separating multi-component waste materials which contain not only nylon 6, but also nylon 6,6. The recovered polyamide may be used in molding applications and in fiber such as carpet fiber.

15 Claims, No Drawings

SELECTIVE POLYAMIDE RECOVERY FROM MULTI-COMPONENT MATERIALS

FIELD OF THE INVENTION

The present invention relates to a process for the recovery of polyamides from multi-component, polymeric waste materials, particularly nylon 6 and nylon 66 from post industrial or post consumer carpets and other waste materials which contain these polyamides.

BACKGROUND OF THE INVENTION

Aliphatic polyamides, particularly nylon 6 and nylon 6,6 are extensively used for a variety of industrial and consumer applications such as carpets and automotive parts. Recycling and recovery of the polymer from these products is important for environmental reasons. The recovered polyamide materials need to be separated from foreign materials such as carpet backing, etc. While there are several approaches to reclamation through a chemical process, whereby the polymers or monomers can be purified and reused to make a high quality polyamide, these routes are expensive. A portion of the difficulties, inherent in the chemical process, relate to the complexity of the recyclable waste material.

Carpets include a face fiber that is adhered to a backing (support) material which may include jute, polypropylene, latex (such as a styrene-butadiene rubber (SBR)) and a variety of inorganic materials such as calcium carbonate, clay, or hydrated alumina fillers.

Nylon 6 and nylon 6,6 are often used for the face fiber in high quality carpets. Other face fibers includes polyethylene terephthalate, polypropylene, and to a much less extent wool and acrylics. Typically, a carpet comprises about 20–55 percent by weight face fiber and 45–80 percent by weight backing materials. In addition, the face fiber contains dyes, soil repellents, stabilizers, and other compounds added during fiber and/or carpet manufacture.

Waste carpet may also contain a host of other impurities, which will collectively be referred to herein as "dirt". A substantial amount of work is dedicated to processes where the polyamide (Nylon 6) is extracted from the waste and fed to a depolymerization process to recover caprolactam.

U.S. Pat. No. 5,241,066 to BASF describes a process for recovering caprolactam from waste containing both polycaprolactam and materials which are insoluble in acidic solvents for polycaprolactam. The process includes: agitating the waste in an acidic solvent capable of dissolving nylon 6 without degrading the acid insoluble materials; separating the solution containing nylon 6 from the insolubles; and feeding the nylon 6 to a depolymerization reactor to obtain pure caprolactam. Several deficiencies exist in this process. Industrial waste and post consumer carpets contain a mixture of polyamides (Nylon 6 and Nylon 66). The use of strong mineral acids, in this process, will extract both of these polyamides. At best only nylon 6 will be recovered to a monomer. These non-nylon 6 components interfere with caprolactam recovery. For example, one of the most difficult problems is that alkaline components, such as the calcium carbonate filler, neutralize the acidic catalysts, such as phosphoric acid, that are conventionally used to promote nylon 6 depolymerization, thus requiring the use of increased amounts of the catalyst. Extracted nylon 66 may interfere with the depolymerization of nylon 6 to caprolactam. Additionally, these types of processes, where only the monomer is recovered, loses the inherent value of the recovered polymer (i.e. one has to polymerize the monomer back to the polymer at some cost).

U.S. Pat. No. 5,310,905 teaches that a mixture of nylon 6 and nylon 66 is first separated from consumer waste, e.g. used carpet or carpet scrap, by extraction with an aliphatic carboxylic acid. The filtrate comprising the acid and extracted nylon 6 and nylon 66 is then depolymerized.

U.S. Pat. No. 5,241,066 teaches that a mixture of nylon 6 and polyethylene terephthalate, which is acid insoluble, is mixed with an acid so that the dissolved nylon 6 may be removed from the polyethylene terephthalate. The removed nylon is then depolymerized.

U.S. Pat. No. 3,317,519 teaches that a yarn blend of nylon 6 and polyethylene terephthalate may be depolymerized by heating with an aqueous alkali metal hydroxide at elevated pressure.

However, in the case of multi-component mixtures or composites that contain nylon 6 as one component, recovery of caprolactam is complicated by the presence of the other components. These other components and/or their decomposition products generated under conventional nylon 6 depolymerization conditions interfere with the isolation of caprolactam, thus necessitating expensive additional purification steps.

An alternative approach to the recovery of polyamides from waste is by the extraction of the polymers using a solvent, and the recovery of the polymer either by cooling the solution to cause precipitation of the polymer, or adding a non-solvent to precipitate the polymer, or removal of solvent by volatilization. The choice of a solvent system is critical to prevent degradation of the polymer, prevent extraction of undesirable materials, monitor the corrositivity of the solvent, control cost and monitor the environmental factors.

U.S. Pat. No. 5,430,068 describes a process for the extraction of polyamides from industrial and consumer application wastes. Boiling ethylene glycol is used to dissolve nylon 66 and the nylon was then allowed to remain in solution from 8 to 240 minutes, during which time the polymer degraded significantly according to the formic acid viscosity, where this value decreased substantially from the original value of 48.5 dl/g to 34.5 to 19.33 to 2.41, respectively. This rate of degradation is not acceptable because during an industrial extraction process, the polymer will be in contact with the solvent for at least 30 minutes.

Another extraction solvent described by this patent is glacial acetic acid. Although this solvent did not cause any change to the molecular weight, as judged by the lack of reduction of the solution viscosity, the solvent is reactive with the calcium carbonate present in the carpet backing causing dissolution of this inorganic material and foaming from the release of carbon dioxide. Moreover, the acid has to be substantially removed by extensive extraction with water to eliminate the acid whose presence in the polymer will cause degradation of the resultant recycled polymer during the subsequent melt processing steps.

Czechoslovakian Patent No. 143,502 claims recovery of caprolactam from waste by dissolving the polycaprolactam component in water or a polycaprolactam solvent under pressure and at high temperatures. The resulting low molecular weight polymer and oligomers are recovered by precipitation or used directly as a solution and then subjected to high temperature decomposition to recover the caprolactam. Two disadvantages exist in this teaching: the polymer recovered from this process can not be directly used since the process relies on breaking down the polymer for ease of dissolution and facile conversion to monomer. Another disadvantage of this teaching is that one can not use this method to recover waste containing both nylon 6 and nylon 66 since the extracted polyamide 66 will interfere with depolymerization to caprolactam.

German Patent No. DE 4421239, describes a process for recovering and processing high molecular weight nylon 6 from waste by depolymerizing the nylon 6 polymer in caprolactam and water mixtures, extracting the low viscosity oligomers, filtering the resultant solution and then repolymerizing to high molecular nylon 6 by subjecting the oligomeric materials to a vacuum at elevated temperatures in a reactor. An advantage of this method is that the resulting oligomer solution is suitable for filtration to remove non-soluble waste.

This method suffers from the lack of selectivity in the recovery of nylon 6, if nylon 66 is also present in the waste. The nylon 66 component, if present, will also be converted to oligomers and will be extracted along with the nylon 6 oligomers. Polymerization of this mix of polyamide oligomers will produce copolymers with a lower melt temperature and inferior mechanical properties than either nylon 6 or nylon 66.

European patent publication, 603,434 A1, describes a method for the separation of polyamides from polyamide containing products by dissolving the polyamides in a suitable, non-chlorinated solvent, filtration of the solution and precipitation of the polymer by adding non-solvent. Acid solvents suggested in this teaching, such as mineral acid and chloroacetic acid, will react with calcium carbonate causing foaming and extraction of this inorganic material into the polymer solution. Further complications arise during the recovery operation. The acid and inorganics presently retained in the polymer will cause instability and degradation of the recovered polyamide during application. Other solvents suggested in this patent such as phenol, cresol, benzyl alcohol, lactams or lactones will result in polymer solutions which have a high viscosity and are difficult to filter at any practical polymer concentrations. Selective separation of nylon 6 from waste containing nylon 66 is not addressed in this art.

SUMMARY OF THE INVENTION

It is an object of the invention to provide a process for selectively recovering nylon 6 and nylon 66 from multi-component, waste materials.

In accomplishing the foregoing object there is provided according to this invention a process for recovering nylon 6 and nylon 66 from a multi-component material, specifically post consumer carpet, including the steps of:

subjecting the carpet mix, in its entirety or in shredded, chopped or crushed form to a specific mixture of a caprolactam/water composition at an elevated temperature range (about 120° to 180° C.) to selectively dissolve the nylon 6 face fiber. The nylon 6 solution is then separated from the insoluble residue including backing materials, polypropylene and other face fibers.

Nylon 66 may be recovered from the insoluble residue by contacting the insoluble residue with a caprolactam/water composition at a temperature ranging from 180° C. to about 240° C. The nylon 66 is dissolved and may then be isolated.

DETAILED DESCRIPTION OF THE PREFERRED EMBODIMENTS

The invention provides a process for selectively recovering nylon 6 and/or nylon 66 from multi-component waste materials. Such waste materials include post industrial or post consumer carpets or other waste materials which contain these polyamides.

There is provided a unique process for recovering nylon 6 and/or nylon 66 from a multi-component material, such as a post consumer carpet.

The carpet mix is subjected in its entirety or in shredded, chopped or crushed form to a specific mixture of a caprolactam/water composition. The carpet mix which includes backing materials, face fibers and the like is subjected to the caprolactam/water composition at an elevated temperature range of from about 120° C. to 180° C. to selectively dissolve the nylon 6 face fiber component. The nylon 6 solution is separated from the insoluble residue which includes backing materials, polypropylene and other face fibers such as nylon 6,6.

Nylon 6 can be recovered from this solution by any combination of the following processes:

Water and caprolactam may be evaporated to recover the nylon 6 resin for molding applications.

The nylon 6 may be precipitated by the addition of water to the solution or pouring the solution into water and filtering out a fine nylon 6 powder.

The nylon 6 may be precipitated by allowing evaporation of the water and lowering the temperature of the solution.

A solidification process may be instituted whereby the concentrated polymer solution is quenched in water and then strands are cut into chips followed by a water extraction.

Lastly, monomer may be recovered by flashing off the caprolactam and then depolymerizing extracted nylon 6 by using a know process such as that of commonly assigned U.S. Pat. No. 5,457,197 or U.S. Pat. No. 5,681,952 or U.S. Ser. No. 08/617,448 filed Mar. 18, 1996. The resulting caprolactam may be used for nylon in engineered plastic applications and fiber such as carpet fiber.

If desired, the inventive process may be completed at such point. The remaining face fiber is then treated to recover nylon 6,6. The residue is brought into contact with a caprolactam/water composition at a higher temperature than was used for the initial nylon 6 component. A temperature ranging from 180° C. to about 240° C. is utilized to selectively dissolve the nylon 6,6 and produce a caprolactam/water nylon 66 solution. The nylon 66 solution is then separated from the insoluble residue which includes backing materials, polypropylene and some remaining face fibers.

As described above, nylon 66 may be recovered by any one or any combination of the processes used to recover nylon 6 from the produced solution.

Separation and recovery of nylon 6 and/or nylon 6,6 may be accomplished where there is a mix in the face fibers by a two step process. Where there exists only one of the components as a face fiber, the selected temperature range will allow for the necessary solution to be formed.

The following Examples and Tables are illustrative of the unique process for the recovery of selective polyamides from multi-component waste materials.

EXAMPLES

Inventive Examples 1 through 8 and Comparative Examples I through V

In these Inventive Examples we demonstrate that nylon 6 is very soluble in certain compositions of water and caprolactam at preferred temperature ranges. The solutions obtained from these compositions have acceptable viscosity for ease of removal from the remaining waste components, specifically from carpet backing. Inside a thick wall Pyrex tube (1–2 mm wall thickness to withstand pressure and inner diameter of 5 to 10 mm) were placed nylon 6 carpet face fiber, a charge of caprolactam, an appropriate quantity of water or mixtures of both caprolactam and water. The tubes were then sealed making sure that the wall thickness at the seal was adequate to withstand pressure generated during the heating cycle. The tubes were placed in an oven equipped with a thick Pyrex window to allow observation of the tubes at the appropriate temperatures after half an hour at the prescribed temperature.

Table 1 describes the behavior of nylon 6 fiber at the prescribed temperatures. In Table 1, CE stands for Comparative Example while IE stands for Inventive Example. Nylon 6 exhibited very little solubility in caprolactam at 160° C. After half an hour at 160° C., only a small amount of nylon 6 dissolved in caprolactam forming a thick gel mass. This form of solution is not appropriate for filtration of the polymer solution for nylon recovery.

Water alone, on the other hand, did not dissolve nylon 6 at all or formed thick gel masses.

The appropriate compositions of a caprolactam/water mixture totally dissolved nylon 6 face fiber very rapidly at temperatures forming a solution that could be easily poured into the tubes. A solution of up to 50% nylon 6 could be poured readily in the tube indicating ease of filtration. What we have demonstrated in this example is that with an appropriate composition of caprolactam/water, nylon 6 fiber could be easily dissolved. The such obtained polymer solution can be readily separated from the remaining mass.

The lower temperature boundary for this operation is about 140° C. at which the appropriate caprolactam/water composition can dissolve about 10–20 wt. nylon 6 fiber.

A higher temperature would facilitate the dissolution rate and quantity of nylon 6 recovered, but at temperature much higher than 160° C., the carpet backing, mostly polypropylene and latex, would start to crumble and form gummy compositions which are difficult for separation. Moreover at higher temperature other carpet components and impurities cannot be separated with ease from the carpet mass. Higher extraction temperature would also interfere with the selectivity of this process for nylon 6.

Inventive Example 9 and Comparative Examples VI and VII

In this Inventive Example, we demonstrate that nylon 6 is very stable under the suggested extraction condition. Twelve grams of nylon 6 carpet face were placed into a stainless tube equipped with a cap, release valve and pressure gauge. Added to this were 14 grams of caprolactam, and 14 grams of water. The cap was placed on the tube and tightened. The valve was closed. Several tubes of this type were prepared at once. The tubes were then placed inside an aluminum block which was kept at a predetermined temperature. After a certain time, the tubes were drawn out of the block and quenched in water at room temperature. The content of the tubes were scraped off and were washed 3 times with 300 ml of water, they were then dried inside a vacuum oven at 95° C. and then were analyzed for Formic acid viscosity and end groups, COOH and $NH_2$. The data is tabulated in Table 2A below wherein CE stands for Comparative Example and IE stands for Inventive Example:

TABLE 1

Dissolution Behavior of Nylon 6 Carpet Face Fiber in Water, Caprolactam and Compositions Thereof

| | | Wt of Components (g) | | Observation After ½Hour at the Temperature | | |
|---|---|---|---|---|---|---|
| Example | Nylon WT % | N6 Fiber | Capro-lactam | Water | 140° C. | 150° C. | 160° C. |
| CE I | 10 | 0.7 | 6.30 | — | Gel | Gel is predominant partial dissolution | Some Gel, partial dissolution |
| IE 1 | 10 | 0.7 | 4.05 | 2.25 | Clear Solution, Pours Very Readily* | Clear Solution, Pours Very Readily* | Clear Solution, Pours Very Readily* |
| CE II | 10 | 0.7 | — | 6.30 | Swollen Fiber | Swollen Fiber | Swollen Fiber and Gel |
| CE III | 30 | 2.1 | 4.90 | — | — | Swollen Fiber | Swollen Fiber and Gel |
| IE 2 | 30 | 2.1 | 4.20 | 0.70 | — | Swollen Fiber | Partially Dissolved Some Gels |
| IE 3 | 30 | 2.1 | 3.15 | 1.75 | — | Partially Dissolved Some Gels | Clear Solution Pours Readily* |
| IE 4 | 30 | 2.1 | 2.45 | 2.45 | — | Solution*, Some minute gel | Clear Solution Pours Readily* |
| IE 5 | 30 | 2.1 | 1.75 | 3.15 | — | Fiber Partially Dissolved, gel | Clear Solution Pours Readily* |
| IE 6 | 30 | 2.1 | 0.70 | 4.20 | — | Swollen fiber | Partially Dissolved |
| CE IV | 30 | 2.1 | — | 4.90 | — | Swollen fiber | Gel and Swollen Fiber |
| IE 7 | 50 | 0.50 | 0.30 | 0.20 | — | Partially Dissolved | Clear Solution Pours Readily* |
| IE 8 | 50 | 0.50 | 0.25 | 0.25 | — | Partially Dissolved | Clear Solution Pours Readily* |
| CE V | 50 | 0.33 | — | 0.33 | — | Insoluble | Swollen Gel |

*Solutions which pour readily are easily filterable

Table 2A

Stability of Nylon 6 at 160° C.

| Example | Time at Temp (minutes) | Formic Acid Viscosity | COOH ** | NH$_2$ ** |
|---|---|---|---|---|
| CE VI* | 0 | 52.7 | 26.5 | 27.1 |
| IE 9A | 5 | 42.2 | 42.1 | 12.5 |
| IE 9B | 10 | 43.1 | 38.1 | 13.3 |
| IE 9C | 15 | 42.2 | 37.1 | 11.7 |
| IE 9D | 20 | 44.2 | 47.2 | 14.8 |
| IE 9E | 25 | 42.8 | 44.5 | 14.6 |

*Face fiber washed with water (3 × 300 ml) and dried
**Milliequivalent/kg polymer This data demonstrates that the nylon 6 extracted under our extraction conditions is not significantly altered in molecular weight, even after 25 minutes at 160° C. The polymer may be recovered without degradation under normal manufacturing conditions and be used for engineering plastic applications.

We have also demonstrated in Table 2B below that nylon 6 is stable even at 170° C. In Table 2B, CE stands for Comparative Example and IE stands for Inventive Example. This shows that the extraction conditions are robust, and a small excursion of temperature during extraction operation will not be harmful to the polymer.

Inventive Example 10 and Comparative Example VIII

In this example, small pieces (¼×¼") of nylon 6 carpet were placed in thick-walled glass tubes, an appropriate quantity of water and caprolactam were added and then the tubes were sealed. The tubes were heated in the oven at 140° C. and dissolution behavior was absorbed and reported below in Table 3.

TABLE 2B

Stability of Nylon 6 at 170° C.

| Example | Time at Temp (minutes) | Formic Acid Viscosity | COOH ** | NH$_2$ ** |
|---|---|---|---|---|
| CE VII* | 0 | 52.7 | 26.5 | 27.1 |
| IE 9F | 5 | 47.7 | 41.6 | 16.7 |
| IE 9G | 10 | 46.1 | 38.2 | 16.3 |
| IE 9H | 15 | 43.5 | 37.8 | 14.7 |
| IE 9I | 20 | 44.7 | 38.0 | 16.9 |
| IE 9J | 25 | 45.2 | 38.6 | 17.2 |

*Face fiber washed with water (3 × 300 ml) and dried
** Milliequivalent/kg polymer.

TABLE 3

Dissolution behavior of nylon 6 carpet at 140° C.

| Example | Weight of whole carpet (gm) | Caprolactam (gm) | Water (gm) | Observation at 140° C. |
|---|---|---|---|---|
| IE 10A | 1.40 | 4.05 | 2.25 | Face Fiber totally dissolved after 5 minutes at the temperature. Solution poured readily. Backing settled intact to the Bottom of the tube. |
| IE 10B | 1.40 | 3.00 | 3.30 | Face Fiber totally dissolved after 5 minutes at the temperature. Solution poured readily. Backing settled intact to the Bottom of the tube. |
| CE VIII | 1.40 | 6.30 | 0.00 | Face fiber was partially swollen, but not dissolved. The face fiber in tube was in form of gel. Backing was intact. |

The same experiments were carried out at 150° C. and 160° C. At these higher temperatures the rate of dissolution of nylon 6 is much faster in the water/caprolactam solutions. Caprolactam by itself does not totally dissolve the face fiber even at 160° C. after 1 hour—it only forms gelatinous material which is not suitable for filtration. From these experiments, it is clear that water and caprolactam mixtures selectively and rapidly dissolve nylon 6 face fiber from a whole carpet at a low enough temperature at which the carpet backing is left intact for separation at a later stage. Even though caprolactam is an adequate solvent at elevated temperatures (above 160° C.), it is deficient as compared to a water/caprolactam mixture in its solubility capacity, the rate of dissolution and the ability to form low viscous solutions.

Inventive Example 11

This experiment determined whether other polymer types common in carpet or other industrial waste will be dissolved in caprolactam/water mixtures to cause interference in selective recycling of nylon 6.

Nylon 6, nylon 66, polyethylene terephthalate, and polypropylene were subjected to a 5% and 10% water/caprolactam at 160° C. The polymer content for all runs was held constant at 15 wt. %. The mixtures were put in a glass pressure reaction apparatus (rating of ca. 50 psi) and placed in a constant temperature bath at 160° C. After thirty minutes they were withdrawn and visually inspected to determine whether the polymer had dissolved. The results are tabulated in Table 4 below:

TABLE 4

| Polymer Tested | 5 wt. % water in caprolactam | 10 wt. % water in caprolactam |
|---|---|---|
| Nylon 6 | Dissolved | Dissolved |
| Nylon 66 | Not dissolved | Not Dissolved |

TABLE 4-continued

| Polymer Tested | 5 wt. % water in caprolactam | 10 wt. % water in caprolactam |
|---|---|---|
| PET | Not done | Not dissolved |
| PP | Not done | Not dissolved |

Inventive Example 12

This experiment illustrates how rapidly nylon 6 is dissolved from carpet backing. A three gram sample of nylon 6 carpeting (50 wt. % nylon 6) containing the primary and the secondary backing was placed in 17.0 grams of 10 wt. % water: 90% wt. caprolactam in a Pyrex pressure vessel and then the vessel was immersed in a constant temperature bath at 160° C. After 10 minutes, the nylon 6 dissolved away leaving the backings intact in their original structural form.

Inventive Example 13

This experiment illustrates how one selectively extracts nylon 66 from other used carpets or industrial waste materials. In this example, we used a nylon 66 type face fiber. The composition of materials used in this experiment were: 1.4 grams face fiber, 3.6 grams caprolactam, and 2.0 grams water. The materials were sealed in a Pyrex tube and placed in an oven. The dissolution behavior noticed as a function of temperature is reported in Table 5 below:

TABLE 5

Selective Dissolution of Nylon 66

| Time and Temperature | Observations |
|---|---|
| 1 hr at 140° C. | Fiber did not dissolve or swell |
| 1 additional hr at 150° C. | Fiber did not dissolve or swell |
| 1 additional hr at 160° C. | Fiber did not dissolve |
| 1 additional hr at 170° C. | Fiber did not dissolve |
| 1 additional hr at 180° C. | Fiber dissolved |

We have demonstrated that nylon 66 is not soluble under the extraction conditions of nylon 6, but could be dissolved at 180° C. This system allows us to selectively remove nylon 6 and nylon 66 from a mixture containing these polyamides and other polymers. The dissolution of nylon 6 is achieved at a lower temperature where nylon 66 is insoluble. After nylon 6 is dissolved at a lower temperature and removed by filtration , nylon 66 may be removed by extracting the remaining mass of mixed polymers with a caprolactam/water mixture at a higher temperature(180° C. or higher). The temperature dependence of the solubility of the polyamides are related to the melting point of polyamides. Higher melt temperature polyamides such as nylon 46 will require an even higher dissolution temperature and a lower melt polyamide such as a copolymer of nylon 6 and nylon 66 would be soluble at a lower temperature than, this temperature dependence of the solubility could be used for selective extraction of various polyamides.

The foregoing description and Examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

We claim:

1. A process for selectively recovering a polyamide from a multi component material comprising the steps of:

(a) subjecting said multicomponent material to a mixture of caprolactam and water at a first temperature below the degradation temperature of said polyamide thereby substantially dissolving said polyamide and forming a polyamide solution wherein said dissolved polyamide has a molecular weight which is not significantly altered from starting polyamide molecular weight;

(b) separating said polyamide solution from an insoluble residue; and (c) recovering said polyamide from said separated polyamide solution.

2. The process for selectively recovering a polyamide from a multicomponent material in accordance with claim 1, wherein said first temperature ranges from about 120° C. to about 180° C. for recovery of nylon 6.

3. The process for selectively recovering a polyamide from a multicomponent material in accordance with claim 1, wherein said first temperature ranges from 180° C. to about 240° C. for recovery of nylon 6,6.

4. The process for selectively recovering a polyamide from a multicomponent material in accordance with claim 1, wherein said polyamide is recovered from said polyamide solution by an evaporation process.

5. The process for selectively recovering a polyamide from a multicomponent material in accordance with claim 1, wherein said polyamide is recovered from said polyamide solution by precipitation of said polyamide by addition of water to said polyamide solution or addition of solution into water followed by filtration of a fine polyamide powder.

6. The process for selectively recovering a polyamide from a multicomponent material in accordance with claim 1, wherein said polyamide is recovered from said polyamide solution by solidification of said polymer solution through quenching in water and cutting strands formed into strips followed by water extraction.

7. The process for selectively recovering a polyamide from a multicomponent material in accordance with claim 1, wherein said polyamide is recovered by flashing off lactam/water from said polyamide and depolymerizing said nylon 6.

8. The process for selectively recovering a polyamide from a multicomponent material in accordance with claim 1, further comprising the step of:

d) taking said insoluble residue and adding (a second mixture of caprolactam and water at a second temperature range below the degradation temperature of a second polyamide to be recovered thereby forming a second polyamide solution;

(e) separating said second polyamide solution from a second insoluble residue; and (f) recovering said second polyamide from said second polyamide solution.

9. The process for selectively recovering a polyamide from a multicomponent material in accordance with claim 8, wherein said first temperature ranges from about 120° C. to about 180° C. for recovery of nylon 6.

10. The process for selectively recovering a polyamide from a multicomponent material in accordance with claim 8, wherein said second temperature ranges from 180° C. to about 240° C. for recovery of nylon 6,6.

11. The process for selectively recovering said polyamide from said multicomponent material in accordance claim 1 wherein the time to substantially dissolve said polyamide in step a) is less than 30 minutes.

12. The process for selectively recovering said polyamide from said multicomponent material in accordance with claim 1 wherein the time to substantially dissolve said polyamide in step a) is about 5 minutes.

13. The process for selectively recovering said polyamide from said multicomponent material in accordance with claim 1 wherein said first temperature is less than about 160° C. for recovery of nylon 6.

14. The process for selectively recovering said polyamide from said multicomponent material in accordance with claim 1 wherein the multicomponent material is carpet.

15. The process for selectively recovering said polyamide from said multicomponent material in accordance with claim 1 wherein step (a) said dissolved polyamide has a molecular weight which is no more than about 13% reduced from the starting polyamide molecular weight.

* * * * *